United States Patent
Cunningham et al.

(10) Patent No.: US 10,528,357 B2
(45) Date of Patent: Jan. 7, 2020

(54) WEB-BASED RECORDER CONFIGURATION UTILITY

(71) Applicant: L3 TECHNOLOGIES, INC., New York, NY (US)

(72) Inventors: Daniel J. Cunningham, Sarasota, FL (US); Todd R. White, Lakewood Ranch, FL (US)

(73) Assignee: L3 TECHNOLOGIES, INC., New York, NY (US)

( * ) Notice: Subject to any disclaimer, the term of this patent is extended or adjusted under 35 U.S.C. 154(b) by 50 days.

(21) Appl. No.: 14/157,621

(22) Filed: Jan. 17, 2014

(65) Prior Publication Data

US 2015/0205615 A1    Jul. 23, 2015

(51) Int. Cl.
*G06F 9/24*     (2006.01)
*G06F 9/4401*   (2018.01)
*G06F 9/445*    (2018.01)
*G06F 21/44*    (2013.01)
*G06F 15/177*   (2006.01)

(52) U.S. Cl.
CPC ........ *G06F 9/4401* (2013.01); *G06F 9/44505* (2013.01); *G06F 21/44* (2013.01); *G06F 9/4411* (2013.01); *G06F 15/177* (2013.01)

(58) Field of Classification Search
CPC .................................................. G06F 9/4401
USPC ............................................................. 713/1
See application file for complete search history.

(56) References Cited

U.S. PATENT DOCUMENTS

| 6,141,712 A * | 10/2000 | Sudhakaran | G06F 9/4401 710/104 |
| 6,587,124 B1 * | 7/2003 | Slaby | H04L 41/0856 715/735 |
| 6,957,195 B1 * | 10/2005 | Kenyon | G06F 21/10 705/50 |
| 9,438,418 B1 * | 9/2016 | Pedersen | H04L 9/0861 |

(Continued)

FOREIGN PATENT DOCUMENTS

WO    2008/157491 A1    12/2008
WO    2012147445        1/2012

OTHER PUBLICATIONS

International search Report and Written Opinion dated Apr. 1, 2015 in connection with International Application No. PCT/US2015/011146 (11 pages).

(Continued)

*Primary Examiner* — Volvick Derose
(74) *Attorney, Agent, or Firm* — Dickinson Wright PLLC

(57) ABSTRACT

A method and system for identifying a data recorder based upon a unique signature generated for the data recorder. Configuration information is received, the information specifying a plurality of data recording input parameters which are selected to facilitate use of the data recorder in a particular data recording application. A unique signature is generated according for the data recorder, the unique signature including a code which uniquely identifies the data recorder based on a transformation of the configuration information. The unique signature is stored for subsequent access or reference. To differentiate between similar makes and models of data recorders, at least a portion of the unique signature includes a unique core part number that is assigned to only one data recorder by, for example, the manufacturer of the data recorder.

16 Claims, 10 Drawing Sheets

(56) References Cited

U.S. PATENT DOCUMENTS

| | | | | |
|---|---|---|---|---|
| 2004/0247205 | A1* | 12/2004 | Nagaya | H04N 5/76 382/305 |
| 2005/0144653 | A1* | 6/2005 | Creamer | H04N 1/00214 725/148 |
| 2006/0031230 | A1* | 2/2006 | Kumar | G06F 17/30194 |
| 2006/0242088 | A1* | 10/2006 | Yamamoto | G06F 21/645 705/76 |
| 2007/0011108 | A1* | 1/2007 | Benson | G05B 13/0275 706/8 |
| 2007/0078527 | A1* | 4/2007 | Gonzalez-Banos | G06F 19/3406 700/19 |
| 2007/0118431 | A1* | 5/2007 | Johansson | G06Q 30/06 705/26.5 |
| 2008/0148249 | A1* | 6/2008 | Komiya | G05B 19/042 717/168 |
| 2009/0222541 | A1* | 9/2009 | Monga | H04L 29/12113 709/222 |
| 2010/0080086 | A1* | 4/2010 | Wright | H04B 11/00 367/191 |
| 2010/0229069 | A1* | 9/2010 | Yamaguchi | G06F 21/10 714/752 |
| 2010/0257360 | A1* | 10/2010 | Bae | H04L 9/0866 713/168 |
| 2010/0257410 | A1* | 10/2010 | Cottrell | G06K 7/10009 714/45 |
| 2010/0275036 | A1* | 10/2010 | Harada | G06F 21/10 713/189 |
| 2010/0325735 | A1* | 12/2010 | Etchegoyen | G06F 21/121 726/26 |
| 2010/0332267 | A1* | 12/2010 | Etchegoyen | G06Q 10/02 705/5 |
| 2012/0005747 | A1* | 1/2012 | Tribble | G06F 21/34 726/18 |
| 2012/0151007 | A1* | 6/2012 | Mescher | G06F 11/3006 709/219 |
| 2013/0227304 | A1* | 8/2013 | Suenaga | G06F 21/602 713/193 |
| 2013/0274964 | A1* | 10/2013 | Jesse | G05D 1/0077 701/14 |
| 2014/0047240 | A1* | 2/2014 | Kato | H04L 9/0866 713/171 |
| 2014/0047567 | A1* | 2/2014 | Haselsteiner | G06K 19/073 726/34 |
| 2014/0347193 | A1* | 11/2014 | Ljung | H04L 67/04 340/870.01 |
| 2014/0358792 | A1* | 12/2014 | Berke | G06Q 30/018 705/50 |
| 2014/0359303 | A1* | 12/2014 | Berke | G06F 21/73 713/189 |
| 2015/0310271 | A1* | 10/2015 | Omar | G07F 17/42 382/190 |

OTHER PUBLICATIONS

Extended European Search Report dated Sep. 12, 2017 for related European Application No. 15737599.9.

* cited by examiner

400

MADRAS DNA Profile

Use this form to initiate a MADRAS DNA Profile.

☒ Required ☒ Optional

402

System Type: ☒ MADRAS Flight Data Recorder

MADRAS Part No: ☒ [          ]

DNA Signature: ☒ [Generate New DNA Signature ▼]

Profile Title: ☒ [          ]

Aircraft Make: ☒ [          ]

Aircraft Type: ☒ ○ Fixed Wing
○ Helicopter

Word Rate: ☒ [256 ▼]

ARINC 429 Channels: ☒ [NA ▼] Only required and recorded with New DNA Signature

Controls: ☒ ☐ Enable DAQ

☐ Enable ARINC 717

[Submit]

| DNA Profile ID | MADRAS DNA Signature |
|---|---|
| 1 | 0000-F000-0000-0000-F000-7FFF-0000-0000-FFFF |

| Parameter ID | Parameter Name | Signal Type | Latch Type | Bit Position | Samples p/Sec | Parameter Type |
|---|---|---|---|---|---|---|
| DS21 | Weight on Wheels | Serves | Latch High | 4 | 8 | Discrete |
| DS22 | Push to Talk | Shunt | Latch Low | 10 | 2 | |
| DS23 | Auto Pilot | Shunt | No Latch | 12 | 16 | |
| DS24 | Speed Brake On | Serves | Latch Low | 16 | 2 | |

Save DS Configuration

WEB-BASED RECORDER CONFIGURATION UTILITY

BACKGROUND OF THE INVENTION

Statement of the Technical Field

The present disclosure relates to flight data recorders. More specifically, the present disclosure relates to creating a unique profile signature for a flight data recorder.

Description of the Related Art

Flight data recorders have a great history of improving the safety of aircraft travel. As aircraft manufacturers have improved the design and manufacture of their aircraft, the complexity of many aircraft functions and systems has increased dramatically. This complexity has forced the aviation recorder industry to continue to make improvements to its flight data recorders. Flight data recorders can now receive input data from a wide variety of sensors including a wide range of data parameters to help keep track of the multitude of aircraft functions.

Complicating matters for flight data recorder manufacturers, each individual aircraft has a different set of parameters that need to be recorded during operation of the aircraft. As the number of inputs continues to increase, the ability to configure the flight data recorder to record specific parameters becomes increasingly complex. For example, aircraft customers are now demanding the ability to configure their flight data recorders based upon specific desired functionality of their aircraft. At the same time, government and industry regulations require that each configuration of a flight data recorder be uniquely identified, verified and controlled.

The current industry-wide method for controlling configurable equipment is to assign a unique part number to each potential individual configuration and control each potential configuration as a separate entity. This method provide bi-directional identification, where a part number for a specific flight data recorder is tied to a set of specific configuration settings, and the set of specific configuration settings is directly tied to the unique part number. However, this approach has a specific drawback. Configurable equipment, such as flight data recorders, can potentially have hundreds or thousands of potential configurations, resulting in hundreds or thousands of individual part numbers. Managing these individual part numbers and controlling the core hardware and software that control the flight data recorder functionality is difficult using current techniques.

SUMMARY OF THE INVENTION

In one general respect, a specific scenario discloses a method for identifying a data recorder. The method includes receiving configuration information specifying a plurality of data recording input parameters which are selected to facilitate use of the data recorder in a particular data recording application, using a signature generating algorithm to generate a unique signature for said data recorder, the unique signature comprising a code which uniquely identifies the data recorder based on a transformation of the configuration information, and storing the unique signature.

In another general respect, another specific scenario discloses a system for identifying a data recorder. The system includes a processing device and a hardware-based non-transitory storage medium operably connected to the processing device and configured to store a set of instructions. In particular scenario, when executed, the instructions cause the processing device to receive configuration information specifying a plurality of data recording input parameters which are selected to facilitate use of the data recorder in a particular data recording application, use a signature generating algorithm to generate a unique signature for said data recorder, the unique signature comprising a code which uniquely identifies the data recorder based on a transformation of the configuration information, and store the unique signature.

BRIEF DESCRIPTION OF THE DRAWINGS

Embodiments will be described with reference to the following drawing figures, in which like numerals represent like items through the figures, and in which:

FIG. 4 depicts a sample screenshot of an interface window 400 for adding a new profile;

FIG. 7 depicts a sample screenshot of an interface window illustrating displayed results after the parameters are updated;

DETAILED DESCRIPTION

Figure 1:
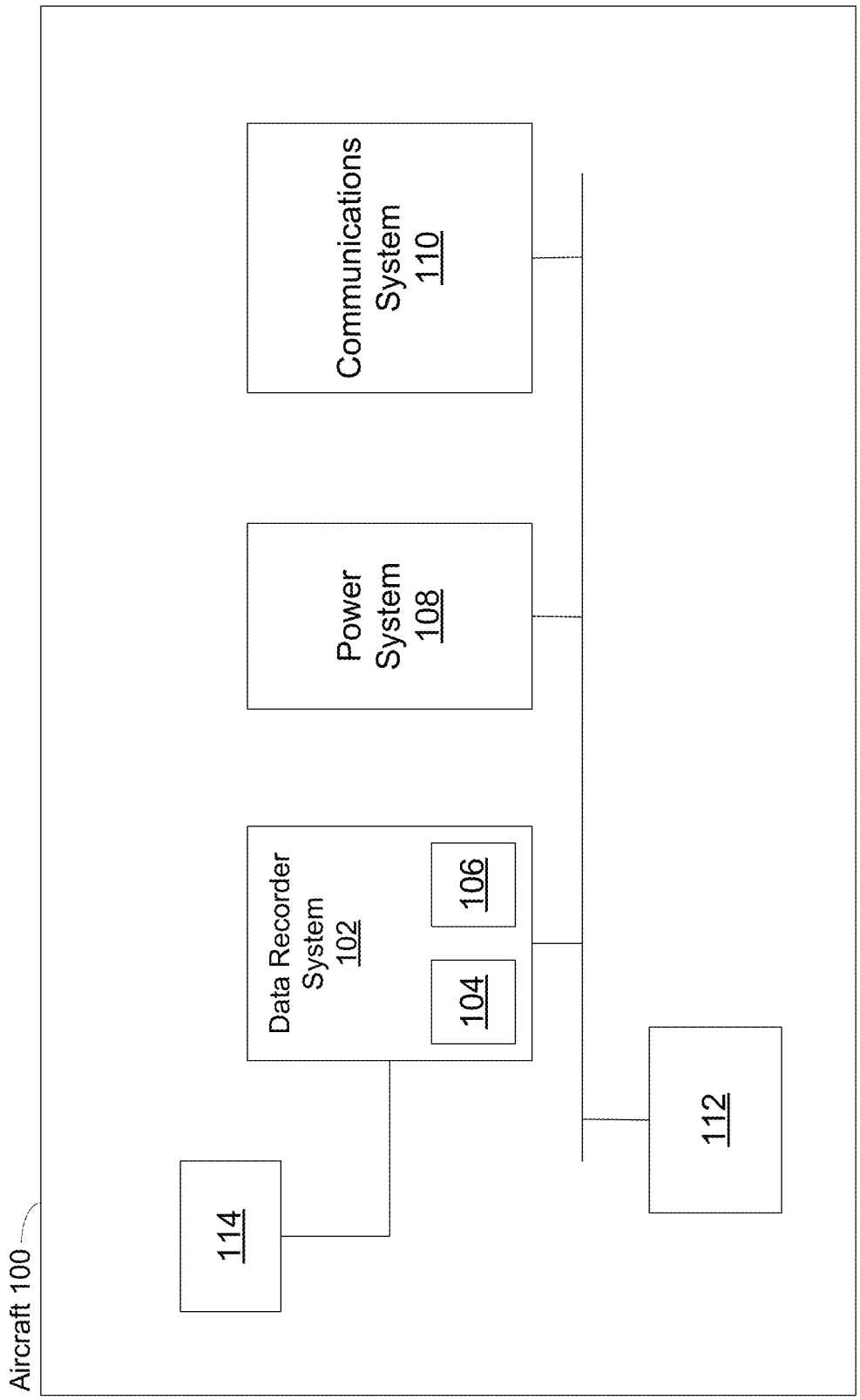
FIG. 1 depicts a simplified block diagram of an aircraft.

This disclosure is not limited to the particular systems, devices and methods described, as these can vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "computing device" refers to a device that processes data in order to perform one or more functions. A computing device can include any processor-based device such as, for example, a server, a personal computer, a personal digital assistant, a web-enabled phone, a smart terminal, a dumb terminal and/or other electronic device capable of communicating in a networked environment. A computing device can interpret and execute instructions.

The present disclosure is directed to a configuration profiler used during configuration of a flight data recorder. The profiler provides a user with a graphical user interface (GUI) environment for setting up a flight data recorder configuration file. As used herein, the configuration file refers to a digital representation of information defining various input parameters and their associated configuration during operation of the flight data recorder. The configuration file is represented by a unique human readable code, such as a hexadecimal number, and a related binary image, which is downloaded into the flight data recorder. The binary image includes a machine-readable representation of the configuration information for use by the flight data recorder during operation. This configuration file is used to identify a customer-specific configuration of the flight data recorder while leaving the core flight data recorder part number unchanged, thereby reducing the overhead associated with storing part numbers related to multiple potential configurations of flight data recorders.

As used herein, the core flight data recorder number refers to a unique serial number assigned to the flight data recorder by the manufacturer. The core flight data recorder number can include at least a portion that indicates a manufacturer and specific model (e.g., the first 8 numbers for a specific model can all be identical), but at least a portion of the core number is unique to each individual flight data recorders (e.g., the last 8 numbers can be incrementally increased for each flight data recorder manufactured). The core flight data recorder number can be physically attached to the exterior of an enclosure for the flight data recorder, e.g., affixed to an identification plate attached to the enclosure. The core flight data recorder number can also be statically encoded in a read only memory (ROM) associated with a processor of the flight data recorder. However, the core flight data recorder number is specifically related to the type of hardware included with the flight data recorder, and is not related to any current or possible configuration of the flight data recorder.

According to the methods and techniques as described herein, changing the configuration of a flight data recorder will result in an update to the configuration file, including both the human readable code and the binary image, while maintaining the original core flight data recorder part number.

As used herein, the term signature refers to the specific human readable code, e.g., a hexadecimal code, generated for a flight data recorder. For each signature, various characteristics will be consistent. For example, each signature is advantageously determined in a way that the signature is unique to a specific flight data recorder and cannot be duplicated under a different configuration. As each signature includes a reference to the core flight data recorder part number for the specific flight data recorder being configured, two flight data recorders with the same configuration will still have unique signatures as each flight data recorder has a unique core number. Additionally, according to the present disclosure, the algorithms and other mechanisms for generating the signature are advantageously locked down such that changes to the fundamental processes for generating a signature do not change. This results in universal and bidirectional identification of a signature and its corresponding configuration information. For example, entering a signature into an associated flight data recorder software application will produce the same configuration, and resulting configuration file, that generated that specific signature. The signature can be accessible and readable from the flight data recorder itself, without additional hardware components or software interfaces, and the signature can be based upon a model where a bit mask is used to identify the configuration elements and combinations thereof. Additional information related to the signature is explained in the following discussion of the figures.

FIG. 1 illustrates a simplified block diagram of an aircraft 100. The aircraft includes an onboard data recorder system 102. The data recorder system 102 will include data recording elements such as a flight data recorder 104 and a voice recorder 106. It should be noted that the data recorder system 102 can include additional components such as a communications interface and various associated connectors. However, the diagram shown in FIG. 1 is simplified to reflect systems and components relevant to the disclosure contained herein.

Aircraft 100 also includes a power system 108. The power system 108 is configured to condition and provide power to the various systems and components of aircraft 100. Additionally, aircraft 100 includes a communication system 110 that is configured to provide communication between the operators of the aircraft and parties outside the aircraft such as ground personnel, air traffic controller, airport staff, and other similar parties.

The aircraft 100 can further include a flight data transmitter 112. The flight data transmitter 112 can be configured to receive information related to the current operation of the aircraft 100 from the data recorder system 102 and transmit the information to an outside party such as an air traffic controller during operation of the aircraft.

As shown in FIG. 1, the data recorder system 102 is operably connected to a series of sensors 114, and receives various state parameters related to the operation of the aircraft 100 from the sensors. For example, the sensors 114 can collect state parameters related to altitude, rate of descent, rate of ascent, landing gear status, autopilot status, engine speed, amount of fuel, oil temperature and pressure, air temperature, wind speed and direction, pitch angle, pitch rate, bank angle, and other various state parameters indicative of the current operation of the aircraft. These state parameters, as received by the data recorder system 102 form the sensors 114, are periodically stored by the flight data recorder 104 and periodically transmitted by the flight data transmitter 112.

Figure 2:
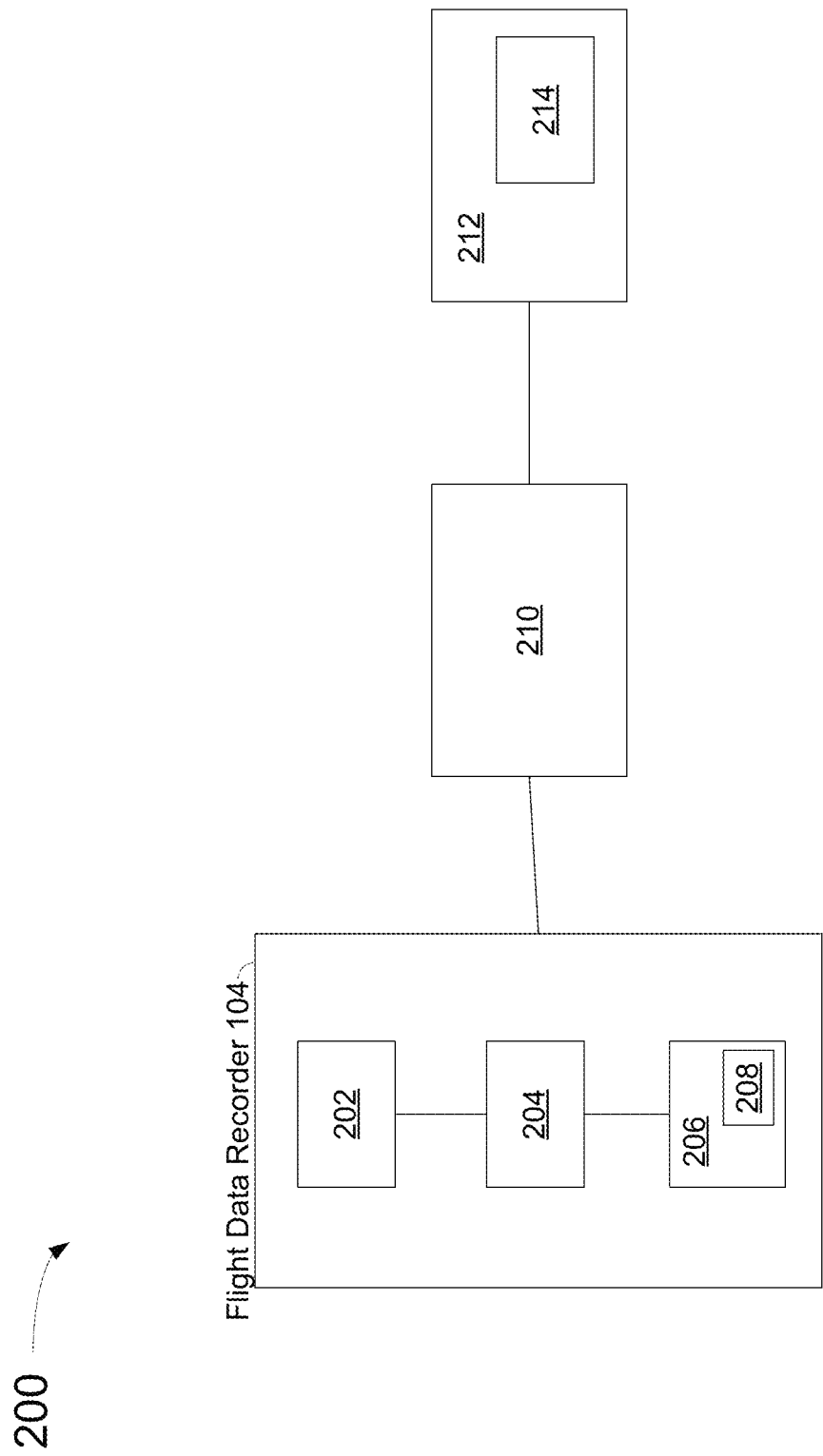
FIG. 2 depicts a simplified block diagram of a system for configuring a flight data recorder.

FIG. 2 illustrates a simplified block diagram of a system 200 for configuring a flight data recorder, such as flight data recorder 104 as shown in FIG. 1. It should be noted that the processes and techniques as described herein are directed to flight data recorders by way of example only. Similar processes and techniques may be applied to additional data recorders such as combination flight recorders, i.e., recorders that include both flight data and voice recording functionality.

As shown in FIG. 2, the flight data recorder 104 will include various hardware components. For example, the flight data recorder 104 will include a communications interface 202, a processor 204, and a memory 206. According to the techniques as described herein, the memory 206 is configured to store the various state parameters related to the operation of the aircraft 100. The memory 206 can also be configured to store additional information such as a configuration file 208 for the flight data recorder 104, the flight configuration file including the signature and binary image for the flight data recorder.

The diagram as shown in FIG. 2 is simplified to reflect systems and components relevant to the disclosure contained herein. For example, the communications interface 202 can be operably connected to one or more connectors for communicating with additional components, such as the data recorder system 102 as shown in FIG. 1. Additionally, the flight data recorder 104 can include a user interface or other means for receiving input directly from a user, such as a power switch, a status indicator switch, and other similar inputs. Accordingly, the flight data recorder 104 can also include various outputs, such as a screen or other similar indicator device for providing status information to the user.

To configure the flight data recorder 104, the flight data recorder is operably connected to a network 210 such that a user of computing device 212 can access and configure the flight data recorder. Alternatively, the computing device 212 can be connected directly to the flight data recorder 104. If a network connection is utilized, the network 210 can be a local area network such as an intranet, or a wide area network such as the Internet. The flight data recorder 104 can be configured to establish a wireless connection (e.g., via an 802.11 Wi-Fi connection) to the network 210. Alternatively, the flight data recorder can include a connector such as an Ethernet port for establishing a wired connection with the network 210. As shown in FIG. 2, a user accesses a web-based or other similarly distributed configuration application 214 via the computing device 212 and provides information related to the current configuration of the flight data recorder 104.

As used herein, configuration application refers to a computer program, software application or other set of computer-executable instructions resident on computer hardware such as firmware or other similar storage media capable of causing a processing device to perform one or more functions. For example, the configuration application as used herein is capable of performing the algorithm processing described herein. The configuration application utilizes this configuration information to create and transmit a configuration file (e.g., configuration file 208) to the flight data recorder, the configuration file including the unique signature for that specific flight data recorder.

Figure 3:
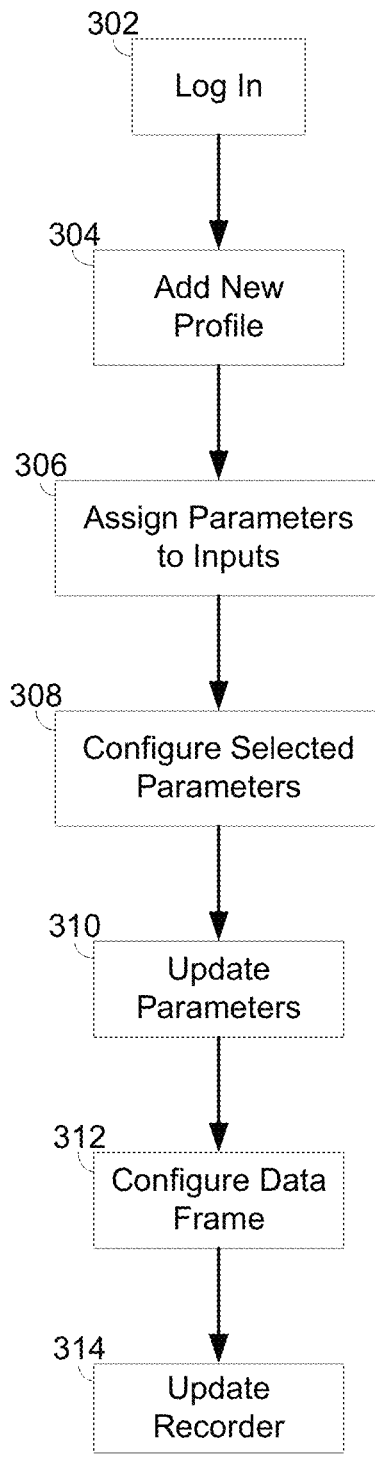
FIG. 3 depicts a process for collecting input parameter configuration information and generating a configuration file for a flight data recorder.

FIG. 3 outlines a process for generating a configuration file for a flight data recorder, such as flight data recorder 104 as shown in FIGS. 1 and 2 using a computing device such as computing device 212 as shown in FIG. 2. Additionally, throughout the following discussion of FIG. 3, reference will be made to FIGS. 4-8 that illustrate various screenshots of the user interface for configuring the flight data recorder.

The process as shown in FIG. 3 can begin when a user accesses the configuration application and provides 302 log in information. For example, an administrator or other similar employee for an aircraft manufacturer can have specific log in criteria assigned to them, allowing them to access the configuration application. After log in 302, the application advantageously provides the ability to add 304 a new profile for a flight data recorder. Alternatively, if a profile exists for a flight data recorder, the user will be able to change the configuration parameters of the existing profile.

FIG. 4 illustrates a sample screenshot of an interface window 400 for adding a new profile. The interface window 400 prompts a user for various information 402, including part number, whether to generate a new signature, a profile title, an aircraft make and type, a word rate for each data frame, type of input channels being used, and various parameters for controls. Various of the information 402 types can include additional information based upon the specific configuration of the application. For example, as shown in FIG. 4, the channel input is specifically configured to reflect ARINC 429 channels, related to the Aeronautical Radio, Inc.'s self-clocking, self-synchronizing data bus protocol. However, it should be noted that the ARINC 429 is used by way of example only. Additional bus protocols such as ARINC 717, ARINC 664P7, and other similar bus protocols can also be used to define the type of flight data inputs on the flight data recorder.

Similarly, in the description of FIG. 3, it is assumed for explanatory purposes only that the flight data recorder is an FA53XX type data recorder, designed and manufactured by L-3 Communications Corporation. The FA53XX flight data recorder includes three types of flight data inputs, including input from external sensors and ARINC busses, input from the ARINC 717 bus, and input from the ARINC 664P7 bus. The application provides the user with the ability to configure the flight data recorder to record from any or all of these input types, and assign specific parameters to each input type.

Based upon what type of inputs the user selects, the application will perform various tasks. For example, if the user selects external sensors and ARINC 429 busses only, the application can query the user to define which sensors and which ARINC 429 inputs are to be included in the configuration. Once these are selected, the user can create a subframe of data and specify where the selected parameters are located within that subframe. Alternatively, if the user selects the ARINC 717 bus only, the ARINC 429 bus only, or a combination of busses, alternative actions can be performed by the application accordingly.

Figure 5:
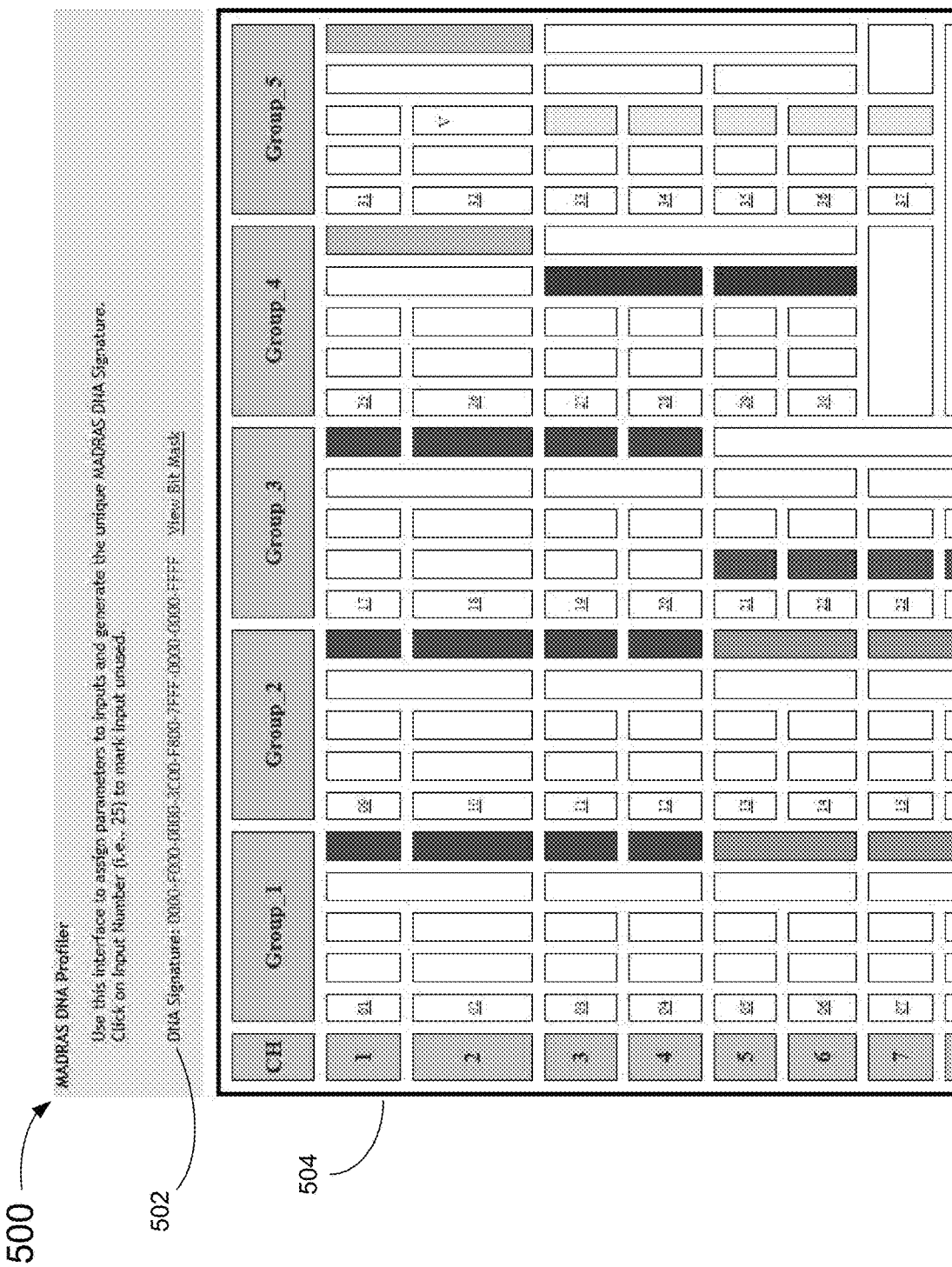
FIG. 5 depicts a sample screenshot of an interface window for providing a user with the ability to assign parameters to the inputs of the flight data recorder.

Referring again to FIG. 3, the user can assign 306 one or more parameters to each of the inputs of the flight data recorder. The FA53XX flight data recorder has 37 available inputs for receiving external sensor data, in addition to the three types of flight data inputs referenced above. As such, the following figures and description will refer to inputs numbered 1-37. However, it should be noted that this numbering is shown by way of example only. Additionally, the various inputs can be organized into groups, and configured as a certain input type. FIG. 5 illustrates a sample screenshot of an interface window 500 for providing a user with the ability to assign 306 parameters to the inputs of the flight data recorder. Additionally, window 500 includes the current signature 502 for that specific flight data recorder. As the user makes any changes to the input parameters, the application can update the signature 502 automatically to reflect that change.

As shown in FIG. 5, the input channels are arranged in various groups in area 504. It should be noted that five groups are shown by way of example only, and other numbers of groups can be used. Additionally, the breakdown and placement of individual channels into groups as shown in FIG. 5 is shown by way of example only, and can vary based upon the type of flight data recorder being used, and the number of available inputs.

Figure 6:
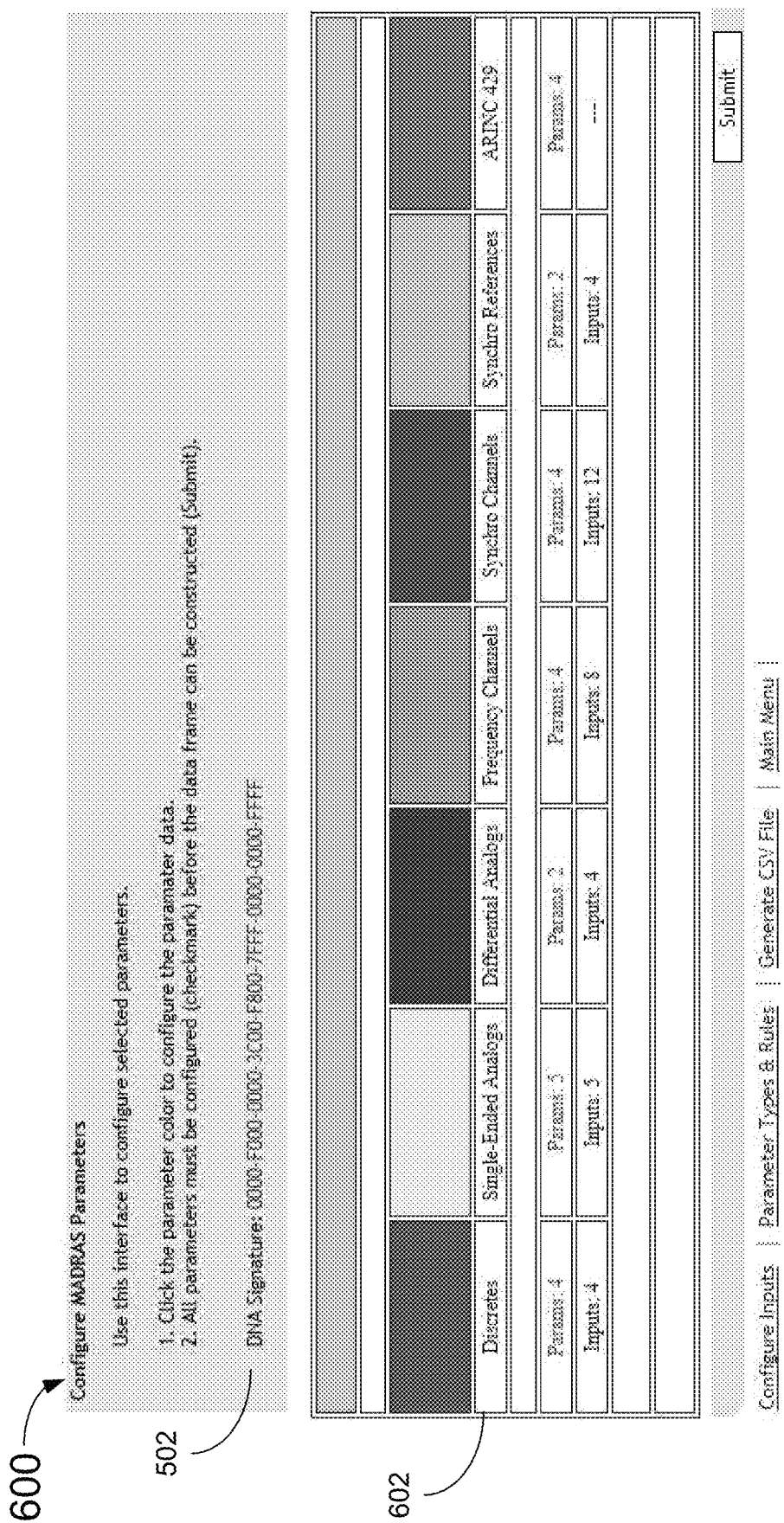
FIG. 6 depicts a sample screenshot of an interface window showing a specific interface for configuring a parameter for a specific input channel.

To assign 306 a parameter to a specific input, the user can select the input channel from area 504 of window 500. Upon selecting an input channel, the user can be prompted to configure 308 a parameter for a selected input channel. FIG. 6 illustrates a sample screenshot of an interface window 600 showing a specific interface for configuring 308 a parameter for a specific input channel. As shown in FIG. 6, the inputs, and associated parameters, can be configured as one of various types 602. For example, the inputs can be configured as one of a series discrete input, a shunt discrete input, a single-ended analog input, a differential analog, a frequency channel input, and a synchro channel input.

More specifically, as used herein, a series discrete input only uses one input channel. Therefore, any of the 37 available inputs can be used as a series discrete input. A shunt discrete input only uses one input for each shunt discrete input that is defined. Therefore, any of the 37 inputs can be used as a shunt discrete input. Similarly, a single-ended analog input uses only one input. Therefore, any of the 37 available inputs can be used as a single-ended analog input.

For differential analog inputs, two input channels are required. This results in a maximum of 18 differential analog inputs that can be configured as each defined differential analog occupies a pair of inputs. For example, differential analog 1 can use inputs 1 and 2, differential analog 2 can use inputs 3 and 4, and so on.

For frequency channel type inputs, two inputs are required for each frequency channel that is defined. Typical flight data recorders have a maximum of four frequency channel inputs that can be configured. As used herein, each frequency channel input occupies specific pairs of inputs. For example, frequency channel 1 can use inputs 5 and 6, frequency channel 2 can use inputs 7 and 8, frequency channel 3 can use inputs 13 and 14, and frequency channel 4 can use inputs 15 and 16.

For a synchro channel type input, three input channels can be used for each input that is defined. Additionally, each synchro channel type input can be tied to a synchro reference input that uses two inputs. For example, synchro channel 1 can use inputs 1, 9 and 17, synchro channel 2 can use inputs 2, 10 and 18, synchro channel 3 can use inputs 3, 11 and 19, and synchro channel 4 can use inputs 4, 12 and 20. Additionally, synchro reference 1 can use inputs 25 and 26, and synchro reference 2 can use inputs 31 and 32.

As defined herein, and as used by the application when providing the user with the ability to configure 308 the parameters, consideration has been given to preventing illegal input configurations that would cause potentially fatal errors. For example, if the user has chosen to configure differential analog input 10 (which, for example, uses inputs 19 and 20), then the application prevents the user from configuring series discrete input 20, shunt discrete input 20, single-ended analog input 20, or synchro channel 4.

Additionally, the user can configure 308 a parameter to include specific ARINC 429 words for input to the flight data controller. As used herein, the FA53XX recorder allows a total of eight separate ARINC 429 channels to be connected. The user is able to configure 308 the parameters to include ARINC 429 words based upon various criteria, including channel values, label values, and source/destination identifier (SDI). As used herein, the channel value can represent the ARINC 429 bus of the word to be recorded. In this example, the valid values for the eight available channels are 0-7. The label value can represent the label of the ARINC 429 word that will be recorded. In this example, the valid values for this field are 1-255. The SDI value represents the two SDI bits of the ARINC word that are to be recorded. Valid values can include zero (only record words that have an SDI value of zero), one (only record words that have an SDI value of one), two (only record words that have an SDI value of two), three (only record words that have an SDI value of three), and four (record all words regardless of the SDI value).

Referring again to FIG. 3, after the user configures 308 the selected parameters, the application can update 310 the parameters accordingly for the flight data recorder being configured. FIG. 7 illustrates a sample screenshot of an interface window 700 illustrating displayed results after the parameters are updated 310. The window includes updated signature 502, as well as information area 702 that includes information related to a specific parameter that has been updated 310. The information 702 can include parameter ID information, a parameter name, a signal type, a latch type, a bit position and the number of samples per second to take of that parameter during operation of the aircraft.

Referring again to FIG. 3, the application can then configure 312 a data frame for the updated parameter information. The application can query the user for the size of the frame into which the data will be inserted. For example, available frame sizes can include 64, 128, 265, 512 and 1024 words. Additionally, various flight data recorders, such as the FA53XX recorder described herein, use super-communication of data. As used herein, super-communication means that the inputs selected to go into the resulting frame can appear more than once a second. For example, the flight data recorder can support rates of 1, 2, 4, 8 and 16 times per second. The amount of times the data is supposed to go into the frame can be dependent upon external specifications, such as the speed of the external sensors and the bandwidth available on any data busses. Additionally, specific avionics system can be configured to output data at a specific rate, e.g., five times per second. If the avionics system is configured to output the data five times per second, and the user selects a high rate of data collection (e.g., eight times per second), the data frame can include "no new data" tags in that frame space instead of real data as new data was not available at the time of collection.

For example, when doing super-communication of data, it can be normal for data from the same input to appear at regular intervals in the frame. For example, if a parameter is to be recorded at eight times a second in a 256 word frame, then the parameter would appear in the frame at every 32 words. Additionally, a frame can include a frame counter word that increments once per frame and is output at a user-specified location within the frame.

Figure 8:
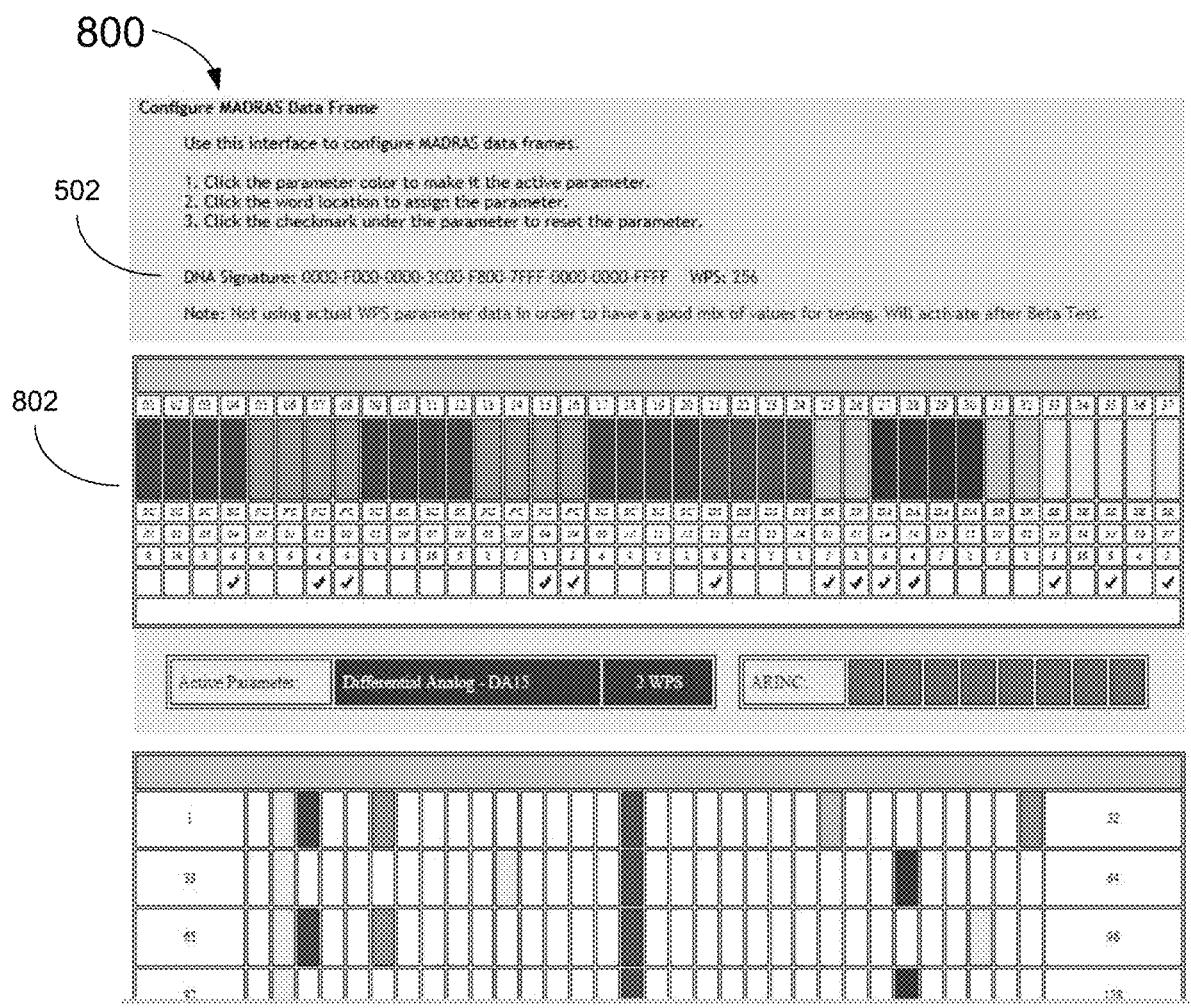
FIG. 8 depicts a sample screenshot of an interface window showing a data frame configured per a user's specific configuration.

FIG. 8 illustrates a sample screenshot of an interface window 800 showing a data frame configured 312 per a user's specific configuration. The window includes the updated signature 502, as well as the actual data frame 802 including an indication of which inputs are being monitored, and how often the results of that monitoring will occur within the data frame.

Referring again to FIG. 3, the updated configuration file, including the updated signature as generated based upon the user-selected configuration information and a binary image file of the configuration data, is transmitted to the flight data recorder and the operation of the flight data recorder is updated 314 accordingly. Additional detail related to the generation of the updated signature based upon the received configuration information is provided below in the discussion of FIG. 9.

Figure 9:
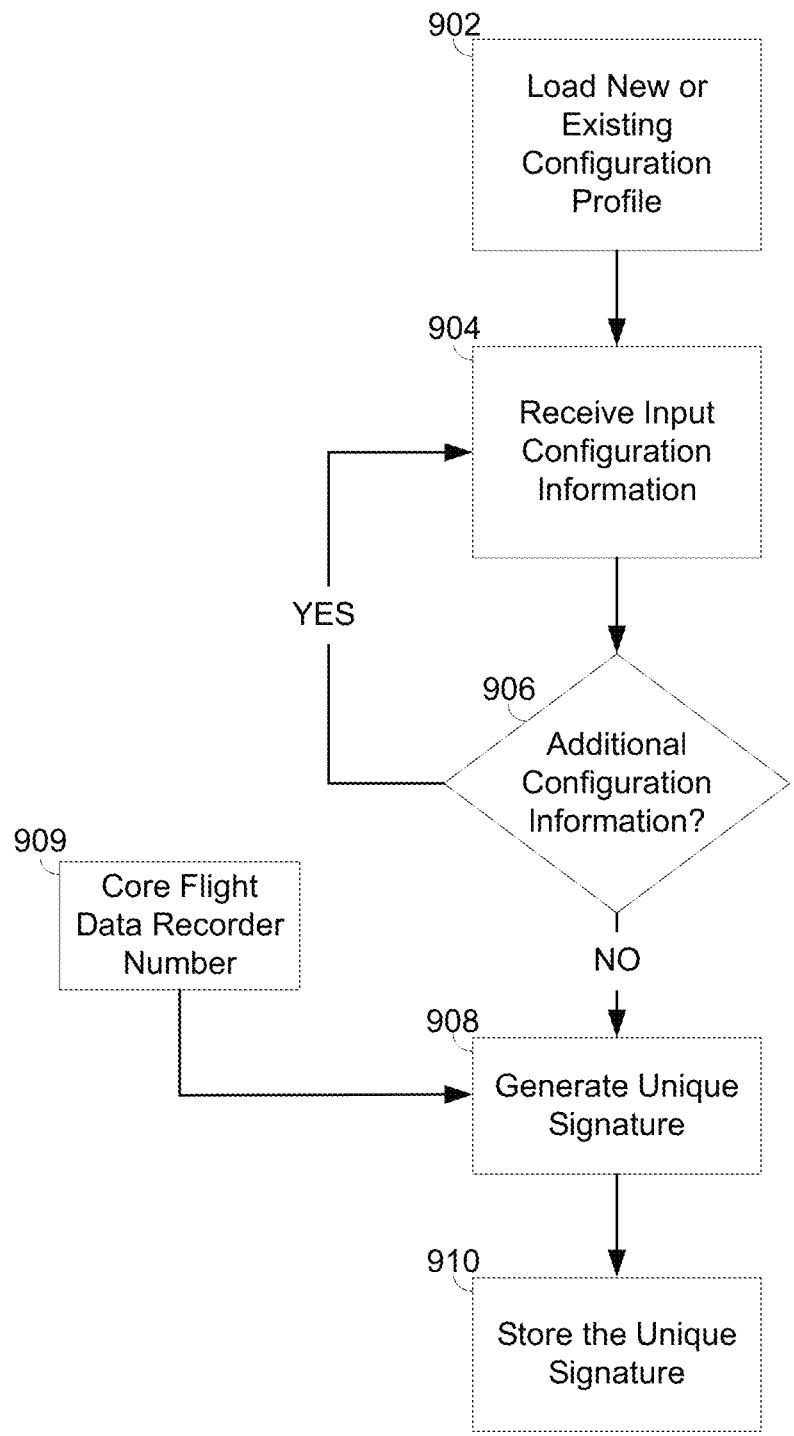
FIG. 9 depicts a process for generating a signature for a flight data recorder based upon received input configuration information.

As briefly described above in the discussion of FIG. 3, the application can generate a unique signature for a specific flight data recorder based upon the configuration information received from the user as well as the core flight data recorder number for the recorder being programmed. The application can continually collect and store the configuration information as received from the user and use a signature generation algorithm to generate the unique signature. FIG. 9 illustrates a sample process for generating the unique signature.

A processing device running the configuration application loads 902 a new or existing configuration profile in response to a user request to either create or update a configuration profile. Like above in FIG. 3, if a profile already exists, the configuration application can load the existing configuration profile from memory. Otherwise, the configuration application can create a new profile, and prompts the user for information related to the new profile such as flight data recorder information and a profile title.

Once the configuration application loads 902 the profile, the application receives 904 input configuration information from the user. As described in detail above in FIG. 3, the configuration information will include various input parameters related to the current input configuration for the flight data recorder being configured. As the user enters the configuration information, the configuration application can determine 906 whether the user has additional configuration to enter. For example, the configuration application can prompt the user to confirm that all configuration information has been entered. If the user does not confirm all configuration information has been entered, the configuration application will continue to receive configuration from the user. Similarly, the configuration interface windows can include a user-selectable input labeled "Configuration Complete, "Update Complete," or some similar phrase. Upon selection of this input by the user, the configuration application can determine 906 that there is no additional configuration information being entered.

Once the configuration application determines 906 that there is no additional configuration information, the processing device running the application will generate 908 the unique signature for the flight data recorder. The unique signature is generated 908 based upon the final received configuration information as well as the specific core flight data recorder number 909 for the specific flight data recorder being configured. If there is an operable connection between the flight data recorder and the processing device running the configuration algorithm, the processing device can access the core flight data recorder number 909 directly from the flight data recorder's memory. Otherwise, if no such connection has been established, the processing device can determine the core flight data recorder number 909 from the loaded 902 configuration profile information.

The processing device will access a signature generation algorithm in order to generate 908 the unique signature. The processing device provides the configuration information and the core flight data recorder number as inputs to the algorithm, and the algorithm outputs a unique signature generated 908 from the input data.

Depending upon the specific desired characteristics of the unique signature, the algorithm can be configured in various manners. For example, a simple algorithm can assign each digit in the signature to a specific input channel associated with the flight data recorder, and the value of that digit in the signature indicates whether the input is active or not, and what type of input is being used on that channel. More specifically, the last word of the unique signature represents the configuration of the parameter data items associated with the inputs (i.e., Discrete ID, Signal Type, Latch Type, Bit Position and Samples per Second). The remaining bits represent the configuration of the 37 inputs (i.e., Discrete, Single-Ended Analog, Differential Analog, Frequency) plus all ARINC 429 channels and labels. The unique number can include a customer ID and unique record ID concatenated together, all input parameters, parameter types, locations and the parameter data item values (making each number unique with no chance of duplication). This information can be stored in both binary and hexadecimal form. The hexadecimal value can be output on the user interface and is visible to the user.

Based upon software limitations, or for other particular reasons, it can be desirable to maintain the length of the signature at 32 bits. Thus, when using the FA53XX recorder as described herein, an alternative algorithm can be used, as the FA53XX recorder includes 37 input channels. In this case, the algorithm for generating the unique signature can be altered to accommodate the increased input channels. For example, the algorithm can divide the input channels into groups. Similar to the groups shown in and discussed in regard to FIG. 5, the algorithm can divide the input channels into a set number of groups, and assign a specific number of bits within the signature to represent the specific combination of inputs within that group. For example, the algorithm can assign the first eight input channels as being group 1, and can use the first four digits of the signature to represent the specific input configuration for that group. Assuming the signature uses hexadecimal numbers, the four digits represent 65,535 different configuration combinations for those 8 inputs. The processing device performing the algorithm can access a data structure include a lookup table, determine the current configuration of the 8 inputs being encoded, and determine a related 4-digit code for that particular configuration of inputs. The processing device can insert that related 4-digit code into the unique signature, and repeat the lookup process for each of the input channel groups until the each specific input channel group is encoded and inserted into the unique signature. Then, like above, the core flight data recorder number can be inserted into the unique signature. Thus, the algorithm is transformative of the input configuration information.

It should be noted that the description of the signature generation algorithm as provided herein is by way of example only. The algorithm can include additional features such as various security measures for further transform the input configuration information, including, but not limited to, encrypting the unique signature so that, while still readable by a human, no specific information can be determined without additional detailed knowledge of how the algorithm operates.

Once generated 908, the processing device stores 910 the unique signature. The processing device can store 910 the unique signature at in memory local to the processing device to maintain a copy of the signature, or on a distributed storage medium such as cloud computing storage facility for access by a user at any computing device that has appropriate access to the cloud storage facility. Additionally, if an operable connection has been established, the processing device will store 910 the unique signature on the flight data recorder itself.

The order of the individual process steps as shown in FIG. 9 is shown by way of example only, and can be altered based upon the specific intended function of the configuration application. For example, the process can be altered such that the generation 908 of the unique signature occurs each time that the user alters the configuration information, rather than as a single process step as shown in FIG. 9. However, in such a scenario, the final generated unique signature will be identical to that as generated by the process as shown in FIG. 9 as the final set of configuration information used to generate the signatures would be identical.

Additionally, the process as shown in FIG. 9 is discussed as being performed on a remote computing device by way of example only. Depending on the processing capabilities of the flight data recorder, such a process can be performed at the flight data recorder itself, without additional hardware requirements. This provides a technician performing routine maintenance of the flight data recorder to perform any input configuration updating directly at the flight data recorder. The flight data recorder can then upload the updated configuration file to a remote storage device to replace any existing outdated configuration files for that recorder.

It should be noted that the processes as shown in FIGS. 3 and 9 are shown by way of example only, and the techniques and teachings as described herein can be applied to alternative processes. For example, a similar process as that shown in FIG. 3 can be used to update an existing configuration file. However, rather than prompt the user to provide information related to the new profile, that information can be extracted from the existing profile and present to the user for review and/or altering. Based upon the updated information, the process as described in FIG. 9 can be used to generate an updated signature. However, the input parameter configuration and generation of a unique signature would remain similar in scope to that as described above in the discussion of FIG. 3, and the accompanying descriptions of FIGS. 4-8, such that as the configuration file and the signature are updated, the core product identification number of the flight data recorder remains unchanged.

Figure 10:
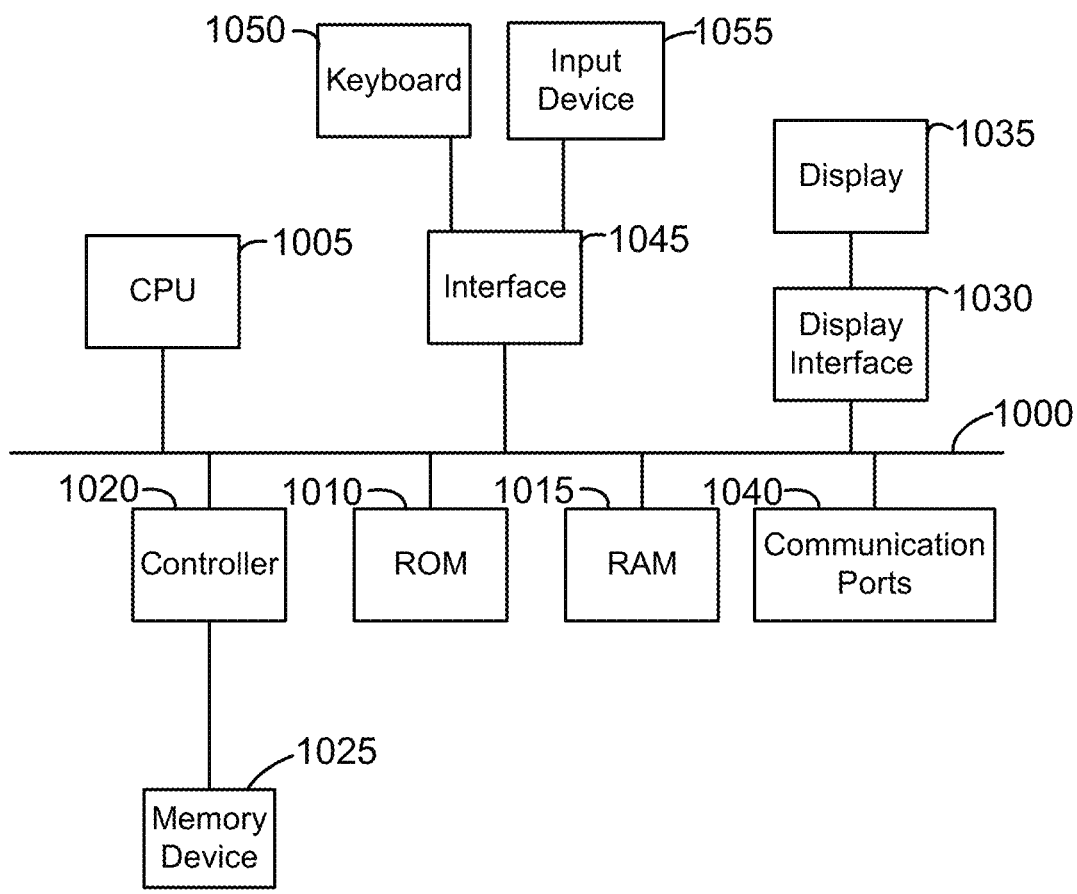
FIG. 10 depicts various embodiments of a computing device for implementing the various methods and processes described herein.

FIG. 10 depicts a block diagram of internal hardware that can be used to contain or implement the various methods and processes as discussed above. An electrical bus 1000 serves as the main information highway interconnecting the other illustrated components of the hardware. CPU 1005 is the central processing unit of the system, performing calculations and logic operations required to execute a program. For example, CPU 1005 can perform the functions performed by the processing device in the above discussions of FIGS. 3 and 9. CPU 1005, alone or in conjunction with one or more of the other elements disclosed in FIG. 10, is a processing device, computing device or processor as such terms are used within this disclosure. ROM 1010 and random access memory (RAM) 1015 constitute examples of memory devices.

A controller 1020 interfaces with one or more optional memory devices 1025 to the system bus 1000. These memory devices 1025 can include, for example, an external or internal DVD drive, a CD ROM drive, a hard drive, flash memory, a USB drive or the like. As indicated previously, these various drives and controllers are optional devices. Additionally, the memory devices 1025 can be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above can be stored in the ROM 1010 and/or the RAM 1015. Optionally, the program instructions can be stored on a tangible computer readable medium such as a compact disk, a digital disk, flash memory, a memory card, a USB drive, an optical disc storage medium, such as a Blu-Ray™ disc, and/or other recording medium.

An optional display interface 1030 can permit information from the bus 900 to be displayed on the display 1035 in audio, visual, graphic or alphanumeric format. For example, various interface windows can be displayed to a user of the system, similar to those as shown in FIGS. 4-8. Communication with external devices can occur using various communication ports 1040. A communication port 1040 can be attached to a communications network, such as the Internet or a local area network.

The hardware can also include an interface 1045 which allows for receipt of data from input devices such as a keyboard 1050 or other input device 1055 such as a mouse, a joystick, a touch screen, a remote control, a pointing device, a video input device and/or an audio input device.

Various of the above-disclosed and other features and functions, or alternatives thereof, can be combined into many other different systems or applications. Various presently unforeseen or unanticipated alternatives, modifications, variations or improvements therein can be subsequently made by those skilled in the art, each of which is also intended to be encompassed by the disclosed embodiments.

What is claimed is:

1. A method for identifying a data recorder having a first operational configuration of at least one of hardware components and software components, comprising:
   receiving, by a processing device, configuration information for changing the first operational configuration of the data recorder to a second operational configuration that is defined by a plurality of data recording input parameters and a configuration for each said data recording input parameters which is to be employed during use of the data recorder in a particular data recording application;
   transforming, by the processing device, the configuration information in accordance with a pre-defined encoding scheme;
   using a signature generating algorithm to generate with said processing device a unique signature for said data recorder, the unique signature comprising a code which uniquely identifies the data recorder based on the configuration information which was previously transformed, wherein the configuration information is recoverable from the unique signature;
   storing, on a memory of said data recorder, the unique signature; and
   responsive to an input request, providing at least the unique signature to a user to facilitate unique identification of the data recorder and the configuration information.

2. The method of claim 1, wherein the unique signature is generated by:
   analyzing each of a plurality of input parameters contained within the configuration information; and
   generating at least a portion of the unique signature based upon each of the plurality of input parameters.

3. The method of claim 1, wherein the code is a human readable set of numeric or alpha-numeric values.

4. The method of claim 1, wherein said processing device generates the unique signature based on said configuration information and on a data recorder core part number which cannot be modified.

5. The method of claim 4, wherein said data recorder core part number is unique to said data recorder.

6. The method of claim 5, wherein said unique signature is generated by generating a signature for said data recorder which is unique
   relative to other similar data recorders based on said unique data recorder core part number.

7. The method of claim 6, wherein a similar second data recorder having identical configuration information as said data recorder will have a unique signature as a result of the similar second recorder comprising a unique data recorder core part number.

8. The method of claim 1, further comprising:
   receiving user-defined values for a data frame for defining a rate of data collection by the data recorder; and
   configuring the data frame based upon the received user-defined values.

9. A system for identifying a data recorder having a first operational configuration of at least one of hardware components and software components, comprising:
   a processing device; and a hardware-based non-transitory storage medium operably connected to the processing device and configured to store a set of instructions that, when executed, cause the processing device to:

receive configuration information for changing the first operational configuration of the data recorder to a second operational configuration that is defined by a plurality of data recording input parameters and a configuration for each said data recording input parameters which is to be employed during use of the data recorder in a particular data recording application, transform the configuration information in accordance with a pre-defined encoding scheme, use a signature generating algorithm to generate a unique signature for said data recorder, the unique signature comprising a code which uniquely identifies the data recorder based on the configuration information which was previously transformed, wherein the configuration information is recoverable from the unique signature, store the unique signature; and provide, in response to an input request, at least the unique signature to a user to facilitate unique identification of the data recorder and the configuration information.

10. The system of claim 9, wherein the processing device is further caused to:

analyze each of a plurality of input parameters contained within the configuration information; and generate at least a portion of the unique signature based upon each of the plurality of input parameters.

11. The system of claim 9, wherein the code is a human readable set of numeric or alpha-numeric values.

12. The system of claim 9, wherein said processing device generates the unique signature based on said configuration information and on a data recorder core part number which cannot be modified.

13. The system of claim 12, wherein said data recorder core part number is unique to said data recorder.

14. The system of claim 13, wherein the processing device is further caused to generate a signature for said data recorder which is unique relative to other similar data recorders based on said unique data recorder core part number.

15. The system of claim 14, wherein a similar second data recorder having identical configuration information as said data recorder will have a unique signature as a result of the similar second recorder comprising a unique data recorder core part number.

16. The system of claim 9, further comprising instructions for causing the processing device to:

receive user-defined values for a data frame for defining a rate of data collection by the data recorder; and configure the data frame based upon the received user-defined values.

* * * * *